July 9, 1957  W. D. HARGUS  2,798,317
GRADING MARKERS
Filed March 29, 1954

INVENTOR.
WILLIAM D. HARGUS
BY Knox & Knox
Agents

United States Patent Office 2,798,317
Patented July 9, 1957

2,798,317
GRADING MARKERS
William David Hargus, Brawley, Calif.

Application March 29, 1954, Serial No. 419,216

3 Claims. (Cl. 40—2)

The present invention relates generally to ground surveying and levelling and more particularly to grading markers for indicating the cut required to level a plot of ground.

In ordinary usage, before levelling a plot of ground, the area is surveyed and markers are set out to indicate the amount of cut or fill required at various points to obtain a level surface. Such markers may be graduated stakes driven accurately to predetermined depths, or may take the form of rough stakes with markings in which the amount of cut or fill is denoted.

The graduated stakes are costly and require considerable labor for accurate placement, and if marked cards attached to the rough stakes are used, they cannot be read or interpreted by the grading machine operator from any great distance to determine the cut and fill operations. Thus the operator of a grading machine is often forced to stop his machine and dismount to inspect the markings before carrying out levelling operations. Similar objections can be made against other various types of markings.

The instant invention overcomes such objections, since the setting out of the markers can be accomplished by personnel of no great knowledge or skill, can be checked quickly and easily by a supervisor, and can be read by the grading machine operator without close inspection.

It is therefore the primary object of this invention to provide grading markers which are easily handled and readily visible from a distance to indicate accurately the amount of cut necessary to obtain a level surface.

Another object of this invention is to provide grading markers which are set out on rough stakes, the markers resting on the actual ground surface so that the cut measurements are accurately determined with reference to the ground.

Another object of this invention is to provide grading markers in which the amount of cut is indicated both by a numerical designation and by a broad visible distinctively marked portion equal in depth to the amount of cut required.

Another object of this invention is to provide such grading markers in which the lower edges of said distinctively marked portions on the correctly positioned markers are on a common reference plane parallel to the required finished grade surface.

Another object of this invention, ancillary to the immediately preceding object is to provide markers which, when provided in sets in which the markers are of uniform length, said distinctively marked portions, although of different widths or heights, all extend downwardly from a line uniformly spaced from the top of the markers, so that the top edges of said portions are an unvarying distance, such as one foot, from the actual surface of the ground before grading.

Another object of this invention is to provide grading markers which are adapted for fabrication from many different materials, so that the choice of material can be according to the dictates of availability and price considerations, the exact sizes and proportions being matters easily determined to suit particular conditions and needs.

Another object of this invention is to provide grading markers which are inexpensive and practicable to manufacture.

Finally, it is an object to provide grading markers of the aforementioned character which are simple and convenient to use, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing, and in which:

Figure 1:
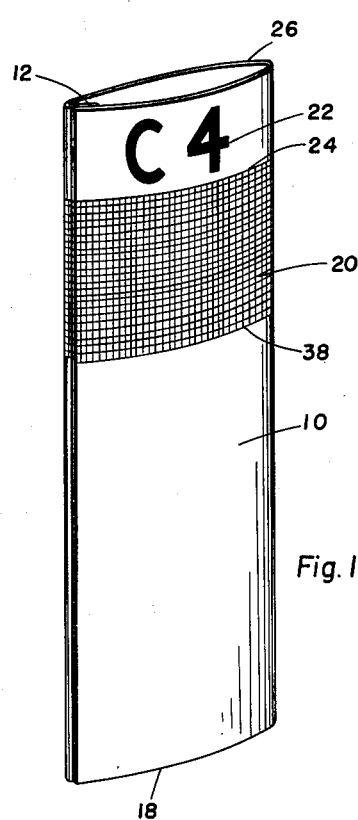
Fig. 1 is a perspective view of a typical grade marker.

Referring now to the drawing in detail, the grade markers each comprise a sleeve 10 of flattened tubular form, which is most efficiently constructed from a flat piece of material folded to shape, the edges being secured, ordinarily by adhesive material, along a longitudinal seam 12. The sleeve may be fabricated from paper or other similar material and may be waxed or otherwise protected to resist moisture and adverse weather conditions.

Figure 2:
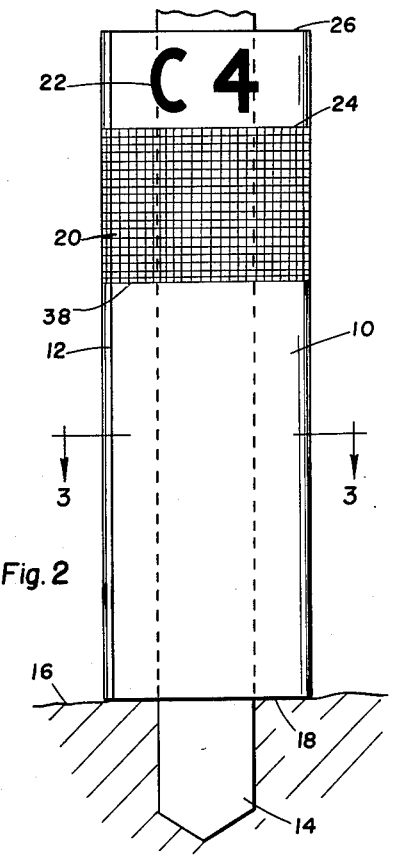
Fig. 2 is a front elevation view of a marker in position on a stake which is driven into the ground.
Figure 3:
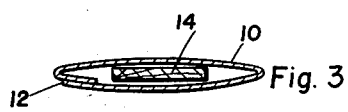
Fig. 3 is a sectional view taken on the line 3—3 of Fig. 2.

The sleeve 10 is open at both ends to facilitate placement on a suitable stake 14, which is inserted in the ground as indicated at 16 in Fig. 2. The stake 14 should be of such a size that the sleeve 10 may slide easily thereon, so that the lower end 18 of said sleeve rests on the ground.

Adjacent the upper end of the sleeve 10 is a visually distinguishable, distinctively marked portion 20, which is illustrated as colored black in the drawing, and above which is a numerical designation or indicia 22. This indicia 22 includes a letter C for cut followed by a numeral, the numeral indicating in units the amount of cut which the marker is to signify. The units may be of any suitable size grading and levelling measurements commonly being given in tenths of a foot. The width of the visually distinguishable portion 20 corresponds to the measurement shown by the indicia 22. Thus the width of the portion 20 is equal to the actual depth of cut indicated by the marker. The upper edge 24 of each portion 20 is at a constant distance from the upper end 26 of the sleeve 10, the band extending downwardly for the indicated width. Since the markers are of uniform length, this results in the upper edges 24 always being the same distance from the ground surface before grading, and this fact is also used by the operator as well as the supervising engineer in checking the work in progress.

Figure 4:
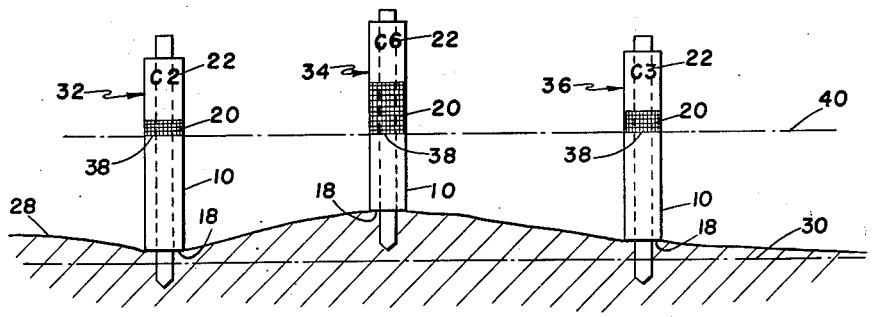
Fig. 4 is a diagrammatic view of several markers erected on a plot of ground to illustrate the function of the markers.

With reference to Fig. 4, it will be seen that a plurality of markers are distributed over the surface of the ground to be levelled, the rough ground surface being indicated by the numeral 28. In actual practice the markers may be some distance apart, often about 40 to 50 feet, and distributed over the entire plot of ground. For purposes of illustration, however, three typical markers are shown closely spaced. Assuming that the ground is to be levelled to the finish grade line 30, the markers are placed at the various positions to indicate the depth of soil to be removed from that particular location. The method of locating the markers and determining the amount of cut required is well known to those skilled in the art of surveying and is described in my United States Patent No. 2,660,822, issued December 1, 1953.

The three markers shown and indicated by the numerals 32, 34 and 36 indicate cuts of 2, 6 and 3 units, respectively, which must be made to reduce the ground surface 28 to the finish grade line 30. When the markers are in position, it will be evident that the lower edge 38 of each portion 20 falls on a common reference plane 40 parallel to the finish grade line 30. Thus, besides indicating the actual depth of cut, the lower edges of the portions 20 also provide visual information establishing a valuable reference plane which may be used for certain sighting operations during grading, one such use being the facilitation of inspection by the supervisor before or during the actual grading operation which would indicate any errors which had crept into the work of surveying, computing or marking resulting in the bottom of the border of any marker not lying on the reference plane. This easy detection of errors is extremely important in actual practice.

The markers, being manufactured from paper or the like, are quite inexpensive and therefore expendable, although it has been found that such markers are durable and may be used extensively before becoming unusable. The indicia 22 are sufficiently large to be read from a distance, so that the operator of a grading machine may, at least roughly, determine the amount of cut required even though he cannot clearly see the numerals. In other words, the portions 20 give a visual representation of the actual depth of cut, the upper edges 24 indicating levels of a fixed distance, such as a foot, above the ungraded surface, while the lower edges 38 of the bands indicate a reference plane a known distance above the finish grade line.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawings are to be considered as merely illustrative rather than limiting.

I claim:

1. A grading marker for indicating necessary localized cut with reference to a grade line, comprising a stake having a ground-penetrating tip and an upwardly extending portion, a tubular sleeve positioned over said upwardly extending portion and having a ground-engaging lower end, said sleeve having a visually distinguishable portion of a critically determined width terminating above said lower end and indicating the vertical distance of the grade line below the ground level when said ground-engaging lower end is in contact with the ground surface, the lower edge of said visually distinguishable portion locally establishing a reference plane at a fixed vertical distance above a grade line, whereby quick inspection of a staked area as to the correct choice and placement of the sleeves is accomplished by simply sighting through the lower edges of the visually distinguishable portions.

2. A grading marker for use in plurality for indicating necessary localized cut with reference to a grade line, comprising a stake having a ground-penetrating tip and an upwardly extending portion, a tubular sleeve of fixed length positioned over said upwardly extending portion and having a ground-engaging lower end, said sleeve having a distinctively marked portion spaced a fixed short distance from the upper end of the sleeve and extending downwardly a critically determined distance and terminating above said lower end and indicating the vertical distance of the grade line from the ground level when said ground-engaging lower end is in contact with the ground surface, whereby the lower edge of said distinctively marked portion of each marker in a plurality of markers constituting means to indicate and establish a common reference plane distance above the grade line, whereby quick inspection of a staked area as to the correct choice and placement of the sleeves is accomplished by simply sighting through the lower edges of the visually distinguishable portions.

3. A grading marker for use in a set of markers for indicating necessary localized cuts with reference to a grade line, comprising a stake having a ground-penetrating tip and an upwardly extending portion, a tubular sleeve of fixed length positioned over said upwardly extending portion and having a ground-engaging lower end, said sleeve having a distinctively marked portion spaced a fixed short distance from the upper end of the sleeve and extending downwardly of a critically determined distance and terminating above said lower end and indicating the vertical distance of the grade line from the ground level when said ground-engaging lower end is in contact with the ground surface, whereby the lower edge of said distinctively marked portion of each marker in a set of markers constitutes means to indicate and locally establish a common reference plane at any unvarying distance above the grade line, and the upper edge of said distinctively marked portion is a fixed distance from the ground when the marker is in use.

References Cited in the file of this patent
UNITED STATES PATENTS
2,660,822    Hargus _____ Dec. 1, 1953